United States Patent [19]

Wycoff et al.

[11] 4,114,142
[45] Sep. 12, 1978

[54] DECODER OPERABLE ONLY ON RECEPTION OF PREDETERMINED NUMBER OF WORDS

[75] Inventors: Keith H. Wycoff, 1205 N. Tyler St., Lexington, Nebr. 68850; William H. Dittmer, Lexington, Nebr.

[73] Assignee: Keith H. Wycoff, Lexington, Nebr.

[21] Appl. No.: 598,587

[22] Filed: Jul. 24, 1975

[51] Int. Cl.² .............................................. H04Q 5/00
[52] U.S. Cl. ................................. 340/164 R; 340/148; 340/171 PF; 340/168 R; 343/225; 343/228; 340/543
[58] Field of Search ........... 340/164 R, 147 MD, 334, 340/148, 168 R; 343/225, 228, 163

[56] References Cited

U.S. PATENT DOCUMENTS

| | | |
|---|---|---|
| 3,046,526 | 7/1962 | Scantlin ............................ 340/164 R |
| 3,387,270 | 6/1968 | Adlhoch ........................... 340/164 R |
| 3,416,133 | 12/1968 | Hunkins ............................ 340/334 X |
| 3,453,597 | 7/1969 | Pomerene ............................ 340/163 |
| 3,659,154 | 4/1972 | Finn ................................. 340/164 X |

Primary Examiner—Harold I. Pitts
Attorney, Agent, or Firm—Vogel, Dithmar, Stotland, Stratman & Levy

[57] ABSTRACT

A memory device stores signals representative of a predetermined number of words constituting a given code. When and only when all the words have been received, a release signal causes the stored signals to be released to a device that displays or otherwise furnishes the information contained in the code. If more or less than the predetermined number of words is received by the decoder, a release signal is not generated.

7 Claims, 7 Drawing Figures

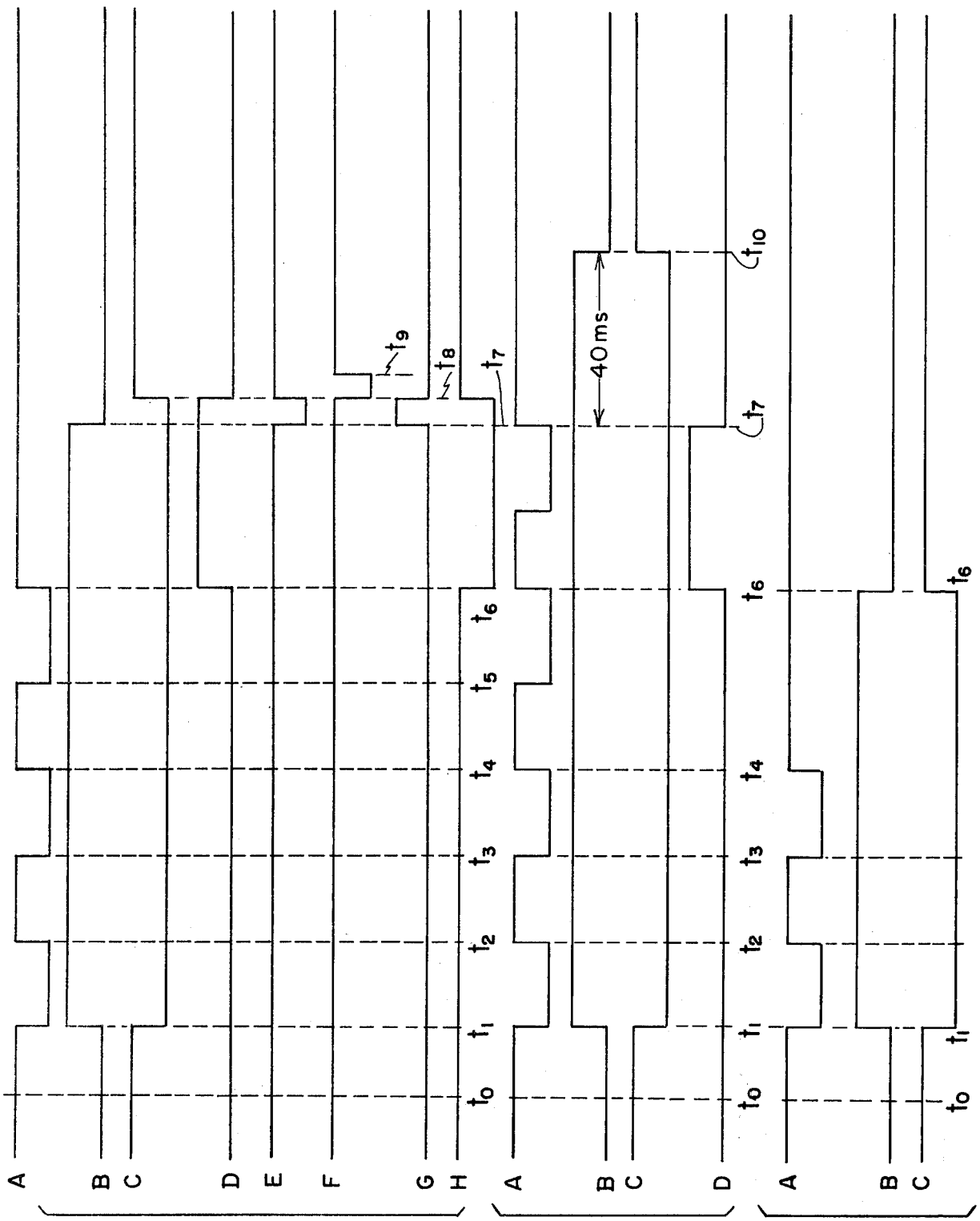

DECODER OPERABLE ONLY ON RECEPTION OF PREDETERMINED NUMBER OF WORDS

BACKGROUND OF THE INVENTION

In a selective call communication system a particular receiver is rendered operative when the carrier wave signal applied thereto contains a certain word or set of words to which the decoder is such receiver is designed to respond. The term "word" is intended to include digital data and analog data such as tones. In systems involving voice communication, the words are transmitted to unsquelch the receiver, whereupon the operator at the transmitter can speak into his microphone and the possessor of the associated receiver will hear the voice communication. Alternatively, the system may involve nonvocal communication, wherein the receiver emits an alerting signal, such as a tone, when the proper words are received.

It has been proposed to use selective call capability in an automatic identification system. In such system, each station, which may be a vehicle, is furnished with a transmitter and an associated encoder to enable the driver to communicate with the base station and also to identify himself without so stating. When the vehicle driver wishes to communicate with the base station, he operates his push-to-talk switch and speaks into his microphone. With automatic identification capabilities, the encoder in his equipment generates a code representing that encoder, which code may be a sequence of tones modulated onto the carrier wave. An identification signal, by way of a suitable display for example, apprises the base station operator of the identity of the station transmitting.

In systems incorporating an automatic identification feature, there are likely to be many mobile stations communicating with the base station, thereby causing frequent transmission of automatic identification signals, and the increased likelihood of falsing the base station. For example, in a system in which the transmitter at each mobile station produces a code including a three-tone sequence, the base station may display a three-digit number corresponding to that mobile station. Two such mobile stations may transmit nearly simultaneously so that the codes overlap. If the strength at the receiver of the signal containing the later starting code is substantially greater than that of the first code, a sequence of four or five or even six tones, depending upon the precise relationship between the two sequences, could be applied to the decoder at the base station. The decoder may respond, for example, to the first two tones of the first code and the first tone of the second code, and therefore cause erroneous information to be displayed. If the strength of the two codes is nearly the same, then the receiver will respond to a hybrid of the overlapping tones. For example, if the last tone in the first code overlaps the first tone in the second code, the decoder will respond to a sequence containing the first two tones and a hybrid of the two overlapping tones, again causing erroneous information to be displayed. A secondary difficulty is the possibility that, for one reason or another, less than the expected number of tones is transmitted to cause an erroneous number to be displayed.

In prior systems having a display that supplied information as the result of a sequence of words, the digits are reproduced on the display just as quickly as they are received. Normally this would not present a significant problem since the lag between the tones is on the order of just 50 milliseconds or less, so that the operator cannot perceive that there is a lag between the occurrence of the display of the several digits. However, in the system described above, the presence of an improper code to such a decoder will result in an improper display.

SUMMARY OF THE INVENTION

It is therefore an important object of the present invention to insure that the receiver at the base station will respond only to exactly the predetermined number of words to which it is designed to respond, that is to say, it will not respond to fewer, nor will it respond to more.

Another object of the present invention is to apprise the base station operator that an erroneous identification has been received but not displayed either because too few words have been received or too many.

Still another object of the invention is to store the signals representative of the words until all the words representing a given code have been received, whereupon the stored signals are released to a display or the like.

In summary, there is provided a decoder responsive to a code including a predetermined number of words and comprising counting means for counting the number of words, circuit means coupled to the counting means and being responsive to exactly the predetermined number of words for producing a release signal, memory means having a signal input coupled to receive the words and being operative to store signals corresponding to the words, and utilization means coupled to the memory means and to the circuit means and being operative to provide information representative of the code only upon receipt of the release signal.

The invention consists of certain novel features and a combination of elements hereinafter fully described, illustrated in the attached drawings and claimed in the appended claims, it being understood that various changes in the details of the decoder may be made without departing from the spirit or sacrificing any of the advantages of the invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages can be readily understood and appreciated.

FIG. 5 is a timing diagram showing waveforms at various points in FIG. 1 in accordance with the capital letters appearing adjacent thereto, when the proper number of words is received by the decoder;

FIG. 6 is a timing diagram like FIG. 5, but is the result of more than the predetermined number of words being received by the decoder; and FIG. 7 is a timing diagram like FIG. 5, but with fewer than the predetermined number of words having been received by the decoder.

DETAILED DESCRIPTION OF THE PREFERRED EMBODIMENT

Figure 1:
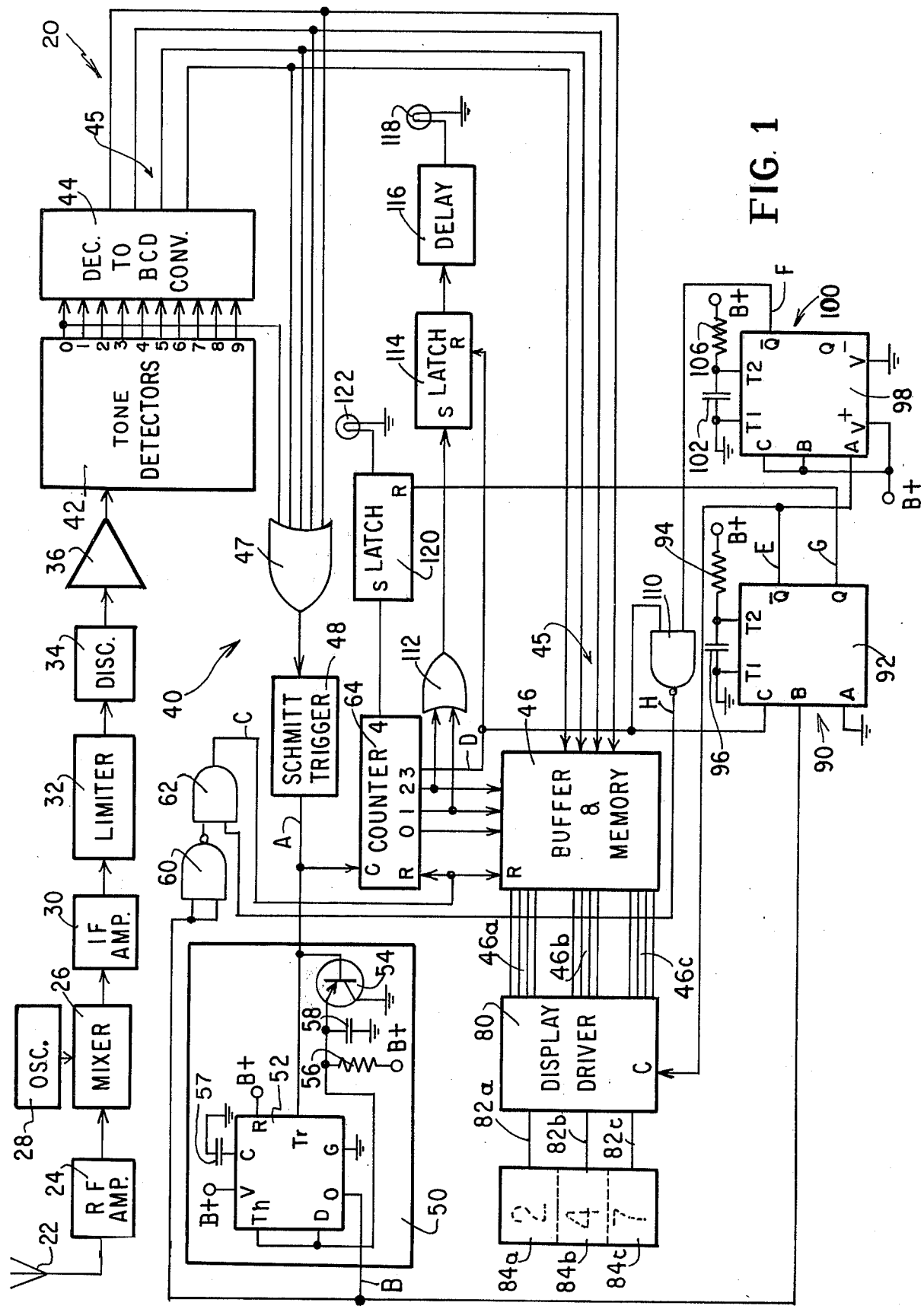
FIG. 1 is a diagram partially in block and partially in schematic depicting a decoder incorporating the features of the present invention.

Turning now to FIG. 1, there is depicted a receiver 20 which incorporates a decoder embodying the principles of the present invention. RF signals are applied to an antenna 22, then amplified by an RF amplifier 24, which signals are heterodyned in a mixer 26, using a local oscillator 28. The resulting IF signal is amplified in an IF amplifier 30 and then further amplified to limiting by a limiter 32. A discriminator 34 detects the code in the IF signal, which code may be digital data or analog data, simultaneously or sequentially sent. The receiver of FIG. 1 is designed to respond to a code including a sequence of three tones. The tones are amplified in an amplifier 36 and applied to a decoder 40.

The decoder 40 is shown to comprise a set of ten tone detectors, collectively and individually identified by the numeral 42. Each tone detector 42 has a standard configuration, in that it includes a filter or the like responsive to a tone of a given frequency, and a rectifier or switch which converts the output of such a filter into a DC voltage. Thus, when a tone is applied to the tone detectors 42 having a frequency corresponding to the resonant frequency of the filter of one of them, a DC voltage is roduced at the corresponding output. The 10 outputs respectively of the ten tone detectors 42 are respectively designated by the numerals "0" to "9." The sequence of three tones applied to the tone detectors 42 will cause signals to appear sequentially on the corresponding ones of the outputs "0" to "9." For example, the first tone may cause a signal to appear on the output "2," the second tone may cause a signal to appear on the output "4," and the third tone may cause a signal to appear on the output "7." In such case, the code corresponding to a certaim mobile station would be "247."

The outputs "0" to "9" of the tone detectors 42 are coupled to a decimal-to-BCD converter 44 which converts the decimal output from the tone detectors 42 to a binary signal on its output 45. The converter 44 has a standard construction to accomplish such conversion in a well-known manner. The binary signal is coupled to a buffer memory device 46. The four outputs 45 of the converter 44, together with the "0" output of the tone detectors 42, are coupled to an OR circuit 47 which produces a sequence of pulses corresponding to the sequence of tones applied to the tone detectors 42. A Schmitt trigger 48 squares off the pulses and improves their rise and fall times. The sequence of pulses produced by the Schmitt trigger 48 is shown in FIG. 5A and is so indicated by the reference letter "A" on the output conductor of the Schmitt trigger 48. In FIG. 5, it is assumed that the first tone appears at the input to the tone detectors 42 at time $t_0$. Because of delay in the operation of the tone detectors 42, the output of the Schmitt trigger 48 does not become "low" until a short time later, that is at $t_1$. As is standard in logic nomenclature, this application will refer to "high" and "low" inputs and outputs. The term "low" means that the voltage is at its low value, for example, zero, and the term "high" means that it is at its high value, for example, close to the supply voltage. While FIG. 5A shows the output of the Schmitt trigger 48 having high and low values for equal times, the relationship depends upon the time it takes for the tone detectors 42 to respond to the tones. The duration $t_0$-$t_2$, corresponding to the duration of the first tone, is fixed, but the time $t_1$-$t_2$ may be longer and the duration $t_0$-$t_1$ shorter, or vice versa, depending on the response time of the detectors 42. Similar comments on the second and third tones are applicable. Switching in response to termination of the tones occurs respectively at $t_2$, $t_4$ and $t_6$. The waveform of FIG. 5A shows a low value for three intervals, corresponding to the three tones applied to the tone detectors 42. These three low values constitute a sequence of three input pulses.

Figure 2:
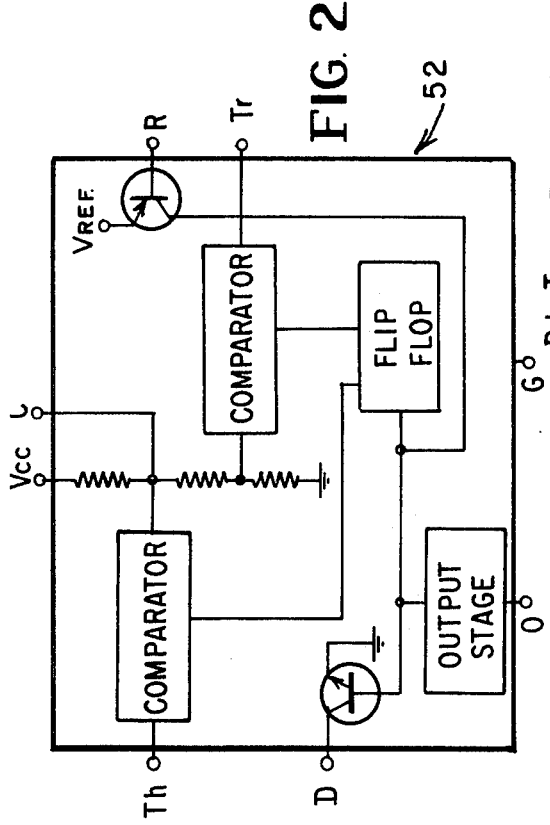
FIG. 2 is a block diagram of an integrated circuit which may be used in the multivibrator circuit 50 of FIG. 1.

The sequence of input pulses from the Schmitt trigger 48 is applied to a retriggerable multivibrator circuit 50 which includes an integrated circuit 52, the details of which are illustrated in FIG. 2. The circuit 52 may be one made by Signetics under its number 555. The reference letters on terminals of the integrated circuits 52 correspond to one another in FIGS. 1 and 2. The circuit 50 also includes a PNP transistor 54, a resistor 56, and capacitors 57 and 58, connected in the manner shown, to form the retriggerable multivibrator circuit 50.

The multivibrator circuit 50 responds to the sequence of pulses from the Schmitt trigger 48 to provide an energizing voltage as shown in FIG. 5B. Its output is normally low. When the tones are detected and the output of the Schmitt trigger becomes low at time $t_1$, the output of the multivibrator circuit 50 becomes high. If no second tone is received within a predetermined time period, then the output of the multivibrator circuit 50 will again become low. Such predetermined time is determined by the values of the resistor 56 and the capacitor 58. However, in the example of FIG. 5, a second tone and a third tone of the proper frequencies are received. The pulses, as shown in FIG. 5A resulting from the two ensuing tones, cause the output of the multivibrator circuit 50 to remain high at time $t_4$ corresponding to the termination of the second tone. The final "time-out" period commences at time $t_6$, corresponding to the termination of the third tone at $t_6$, and ends at $t_7$ when the output of the multivibrator circuit 50 becomes low. The predetermined time should be at least equal to the duration of a tone, so that the output of the multivibrator circuit 50 will remain high for the entire time the tones are present.

The multivibrator circuit 50 is coupled to an inverter circuit 60, the output of which is coupled as one input to an AND gate 62, the output of which is depicted in FIG. 5C. At time $t_1$, when the output of the multivibrator circuit 50 becomes high, the output of the AND gate 62 becomes low, and stays low for the entire duration that the multivibrator circuit output is high. It remains low for an additional time interval $t_7$-$t_8$ as a result of a second input to the AND gate 62 which will be described hereinafter. The output of the AND gate 62 is coupled to the reset input of the buffer and memory device 46 and also to the reset input of a counter 64. The counter 64 has a clock input "C," a reset input "R" and a plurality of outputs "0 to 4". A pulse train applied to the clock input C while the R input is low will cause the outputs "0" to "4" to become high in succession. An example of a counter that may be used in one sold by Solid State Scientific, Inc. under the designation SCL 4017A, which it calls a "CMOS Decade counter/divider." Such device has 10 outputs "0" to "9." In the embodiment of FIG. 1, only the outputs "0" to "4" are used, and therefore the outputs "5" to "9" are not shown. The R input is coupled to the output of the AND gate 62 and the C input is coupled from the Schmitt trigger 48 which furnishes the sequence of pulses shown in FIG. 5A. With such connections, the "0" output is normally high and the other outputs "1" to "4" are normally low. The first positive transition at the clock input "C" causes the "0" output to become low, the "1" output to become high and the "2" to "4" outputs to remain low. The next positive transition at the end of the second tone, at $t_4$, causes the "2" output to become high and the rest of the outputs to remain low, etc. At time $t_6$, the third tone terminates, causing the "3" output to become high and to remain high until the counter is reset at time $t_8$. Normally the "4" output will remain low because the receiver 20 is designed to respond to a sequence of only three tones. However, if a fourth tone is received, such output will become high as will be described hereinafter.

The counter outputs "0" to "2" are coupled to the buffer and memory device 46. The buffer and memory device 46, in addition to having three inputs to receive three counting signals from the counter 64, has a reset input "R" and three binary outputs 46a, 46b and 46c, each consisting of four conductors. During the presence of the first tone, the "0" output of the counter 64 is high, so that the binary signal appearing on the input 45 representative of the first tone is coupled through the buffer and memory device 46 to the output 46a. During the presence of the second tone, the "1" output of the counter 64 is high, so that the signal appearing on the binary input 45 representative of such second tone is coupled through the buffer and memory device 46 to the binary output 46b. Finally, during the third tone when the "2" output of the counter 64 is high, the signal on the binary input 45 representing the third tone is coupled through the buffer and memory device 46 to the output 46c. There will, therefore, appear respectively on the outputs 46a, 46b and 46c three binary signals respectively representing the three tones, until the counter is subsequently reset.

Figure 3:
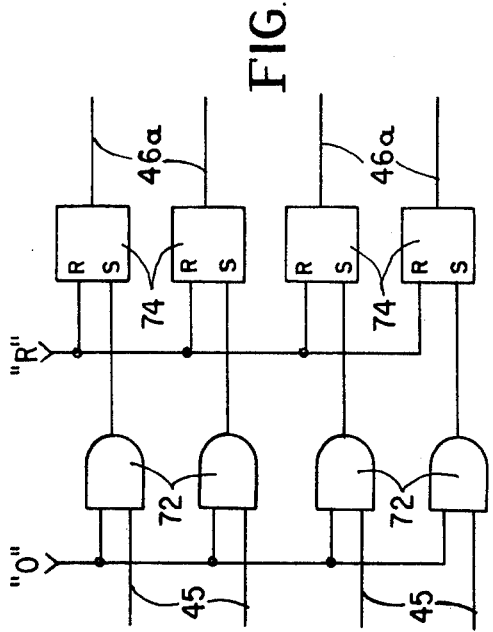
FIG. 3 is a block diagram of one of the channels in the buffer memory device of FIG. 1.

The buffer and memory device 46 may be considered as having three channels, of which one channel 70 is depicted in FIG. 3. It includes four AND gates 72, each having one input coupled to the conductors constituting the binary input 45, and a second input coupled to the "0" output of the counter 64. The outputs of the AND gates 72 are respectively coupled to the "set" inputs of four latching circuits 74, each of which latching circuits 74 also has a "reset" input coupled to the AND gate 62. The second and third channels are similarly constructed except that in the second channel the second input of each of the four AND gates 72 is coupled to the "1" output of the counter 64 and the outputs of the latching circuits 74 are coupled to the conductors constituting the second binary output 46b. In the third channel, each of the second inputs of the AND gate 72 is coupled to the "2" output of the counter 64, and the outputs of the latching circuits 74 are coupled to the conductors constituting the third binary output 46c. In the case of the first channel 70 depicted in FIG. 3, the "0" output of the counter 64 being high during the first tone, causes the corresponding binary signal on the input 45 to be coupled through the AND gate 72 to the set inputs of the latching circuits 74 which therefore furnish on the conductors constituting the binary output 46a a binary signal representative of the first tone. As long as the reset input R remains low, the binary signal appears on the output 46a.

After completion of the tone sequence, the reset input becomes high, as shown in FIG. 5C, causing the latching circuits 74 to unlatch, thereby terminating the binary signals on the outputs 46a to 46c.

The outputs 46a to 46c are coupled to a display driver 80 which has three outputs 82a, 82b and 82c coupled to three identical display devices 84a, 84b and 84c. Although any display device is suitable, a seven-segment display may be used, which is well understood in the art to be an array of seven light-emitting diodes optically magnified to form seven individual segments in the form of a figure of eight. The digit that appears depends on which segments are activated. For example, if all seven segments are activated, then the digit "8" appears. One such display that may be used is made by Hewlett Packard under its designation 5082-7600 series. Each of the display devices 84a to 84c therefore requires seven inputs. The display driver 80 converts the binary signal appearing on each of the outputs 46a to 46c to such seven-bit signals. Motorola, Inc. makes a device under its designation MC14511, entitled "BCD-to-seven Segment Latch/Decoder/Driver." It is constructed with complementary MOS(CMOS) enhancement mode devices and NPN bipolar output drivers in a single monolithic structure. Three such devices are assembled to make up the display driver 80 and are respectively coupled to the display devices 84a to 84c. Each device converts binary information applied thereto into a seven-bit signal, and also remembers or stores such seven-bit signal. In addition, each such device includes a latching switch having a control input. When the control input becomes low, in the manner to be described, the signals stored in the buffer and memory device 46 and present on the corresponding one of the outputs 46a to 46c are coupled to the corresponding one of the display devices 84a to 84c, which then displays the proper digit. When such control input then becomes high, the switch latches on to store the signals from the buffer and memory device 46, thereby maintaining the digit displayed, even after the release signal has ended. A subsequent code reception causes a new release signal, which will cause each digit then displayed to be erased and replaced by a digit in such subsequent code.

By appropriately selecting the tones, there will be caused to be displayed numbers between "010" and "989," except those numbers with adjacent digits that are the same. However, suitable modification may be made in the decoder 40, so that even codes with adjacent digits that are the same may be used.

Figure 4:
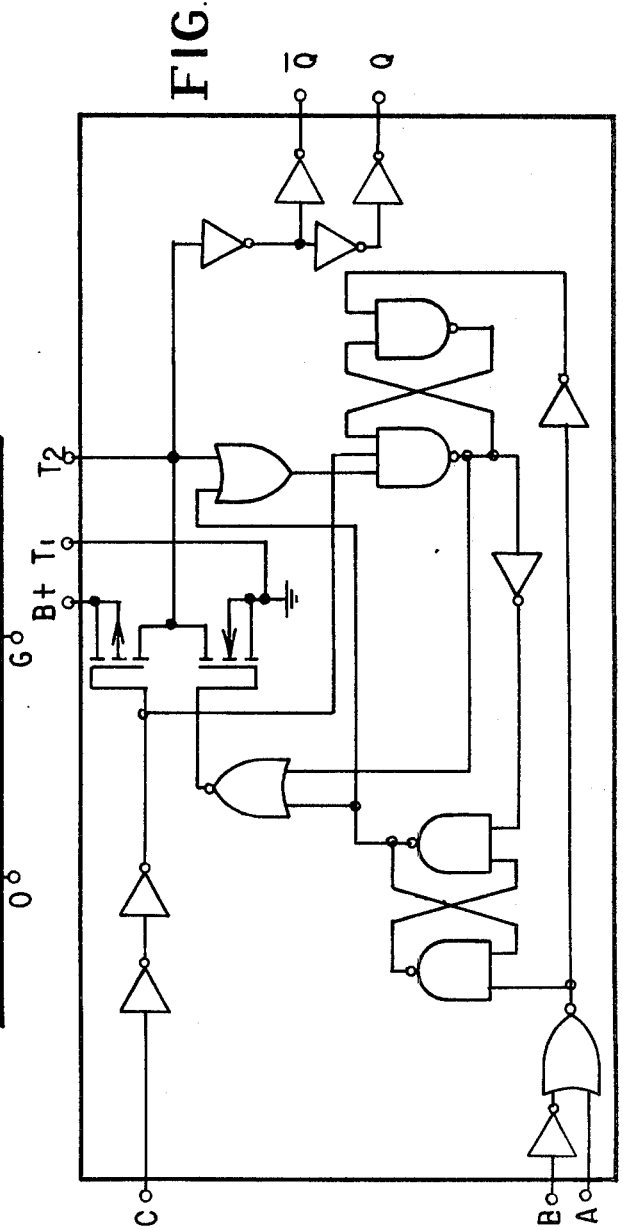
FIG. 4 is a block diagram of an integrated circuit which may be used in each of the multivibrator circuits 90 and 100 of FIG. 1.

The decoder 40 includes a pair of monostable multivibrator circuits 90 and 100, the former being comprised of an integrated circuit 92, a resistor 94 and a capacitor 96 connected as shown, and the latter including an integrated circuit 98, a capacitor 102 and a resistor 106. Motorola, Inc. makes a device, under its designation MC14528, containing two integrated circuits which can be used as the integrated circuits 92 and 98. FIG. 4 depicts one of such circuits, its terminals being labeled with letters corresponding to the letters in the corresponding blocks of FIG. 1. Each of the integrated circuits 92 and 98 has inputs A, B, and C, inputs $t_1$ and $t_2$ to connect to the resistance and capacitance elements that determine the time constant of the associated multivibrator circuit and outputs Q and $\overline{Q}$, one having the opposite polarity of the other. The A input of the multivibrator circuit 90 is grounded, the B input is coupled to the output of the retriggerable monostable multivibrator 50, and the C input is coupled from the "3" output of the counter 64. The time constant of the multivibrator circuit 90, as determined by the values of the resistor 94 and the capacitor 96, is relatively short, for example, ½ millisecond. When and only if the C input of the integrated circuit 92 is high at the same time the B input goes low, the monostable multivibrator circuit 90 switches to its unstable state for a period of time corresponding to its time constant. In the unstable state of the multivibrator circuit 92, the $\overline{Q}$ output becomes low and the Q output becomes high. The B input to the multivibrator circuit 90 is shown in FIG. 5B, and its C input is shown in FIG. 5D. At time $t_7$, the C input is high, because the third tone had been received. Also, at time $t_7$ the B input becomes low, as previously described. As shown in FIG. 5E, the $\overline{Q}$ output becomes low at $t_7$ and remains low until $t_8$, the interval $t_7$-$t_8$ corresponding to the time constant of the multivibrator circuit 90. Similarly, the Q output becomes high for that interval, as shown in FIG. 5G. The signal on the $\overline{Q}$ output constitutes a release signal which is coupled to the C input of the display driver 80. When the C input becomes low, the display driver 80 releases to the display devices 84a to 84c the signals present on the outputs 46a to 46c. Thus, at time $t_7$, after the receipt and cessation of all the tones, a number appears on the display devices 84a to 84c.

The monostable multivibrator circuit 100 operates to reset the counter 64 and the buffer and memory device 46 at $t_8$. In this circuit, the B and C inputs are coupled to the supply voltage and the A input is coupled to the $\overline{Q}$ output of the second multivibrator circuit 90. Thus, at $t_8$, when the $\overline{Q}$ output of the circuit 90 becomes high, as shown in FIG. 5E, the multivibrator circuit 100 switches to its unstable state for a time determined by the time constant of the multivibrator circuit 100. The $\overline{Q}$ output of the multivibrator circuit 100 shown in FIG. 5F is normally high, but switches at time $t_8$ to its low state until time $t_9$, when the $\overline{Q}$ output again becomes high. The time interval $t_8$-$t_9$ may be the same as the interval $t_7$-$t_8$ because of the same time constant of the two multivibrator circuits 90 and 100.

The $\overline{Q}$ output of the circuit 100 is coupled to one input of a NAND gate 110, the other input of which is derived from the "3" output of the counter 64. The output of the NAND gate 110 is coupled as the second input to the AND gate 62. The output of the NAND gate 110, shown in FIG. 5H, is normally high, but at $t_6$ becomes low. At time $t_8$, when the signal produced by the $\overline{Q}$ output of the multivibrator circuit 100 commences, the output of the NAND gate 110 becomes high and remains high. The output of the NAND gate 110 causes the output of the AND gate 62 to remain low beyond $t_7$, that is, until $t_8$. Thus, the energizing signal applied to the reset inputs of the counter 64 and the buffer and memory device 46 remains low from $t_1$ to $t_8$. At $t_8$, the counter 64 and the buffer and memory device 46 are reset, and they both return to their quiescent states. The "0" output of the counter 64 again becomes high, and the rest of the outputs become low, while the buffer and memory device 46 becomes conditioned to accept signals representing the next sequence of words.

The multivibrator circuit 90, therefore, is operative to produce a release signal only when exactly the predetermined number of tones is received. The multivibrator circuit 100 delays resetting of the counter 64 and the buffer and storage device 46.

The "1" and "2" outputs of the counter 64 are coupled as inputs to an OR gate 112, the output of which is coupled to the "set" input of a latching circuit 114. The latching circuit 114 also has a reset input R coupled to the "3" output of the counter 64. The output of the latching circuit 114 is coupled to a delay circuit 116 which, in turn, is coupled to a light bulb 118. When the first and/or second tones are received, the "1" and "2" outputs become high, so that the output of the OR gate 112 becomes high, thereby activating the latching circuit 114. However, a small delay furnished by the delay circuit 116 prevents the latching signal from energizing the light bulb 118. If a third tone is received, its cessation causes the "3" output to become high, thereby resetting the latching circuit 114 and disrupting the latching signal, whereby the light bulb 118 does not become lit. As will be explained shortly, if the "3" output is not received, then the latching circuit 114 is not reset, and after the short delay furnished by the delay circuit 116, the light bulb 118 becomes lit to apprise the operator that less than the proper number of tones has been received.

The "4" output of the counter 64 is coupled to the set input of a latching circuit 120, the reset input R of which is coupled to the Q output of the multivibrator circuit 90. When only three tones are received, the "4" output does not become high, whereby the bulb 118 coupled to the output of the latching circuit 120 does not become lit.

FIG. 6 depicts certain of the waveforms at the points indicated in the circuit of FIG. 1 when four tones are received by the receiver 20. At time $t_1$, the low output of the Schmitt trigger 48 occurring as the result of the receipt of the first tone, causes the energizing signal, shown in FIG. 5C to commence, thereby rendering the counter 64 able to count and energizing the buffer and memory device 46 to perform in the manner previously described. The reset inputs will continue to receive an energizing signal, as shown in FIG. 6C, as the four tones are received. The "0" output of the counter 64, which is normally high, becomes low after the first tone and the "1" output becomes high, all as previously described. After receipt and then cessation of the third tone, the "3" output of the counter 64 becomes high and remains high until $t_7$. The fourth tone which is present for the interval $t_6$-$t_7$ terminates at $t_7$, whereupon the "3" output of the counter 64 returns to its low state, as shown in FIG. 6D. The "4" output of the counter 64 becomes high (not shown in FIG. 6) and remains high until the counter 64 is reset at $t_{10}$.

As is the case with the proper number of tones, the four tones applied to the tone detectors 42 are detected therein and converted to binary information applied to the buffer and memory device 46, the first three of which are respectively coupled to the outputs 46a, 46b and 46c by virtue of the sequence of pulses on the "1," "2," and "3" outputs of the counter 64. The signals on the outputs 46a to 46c are applied to the display driver 80, which prevents them from being converted into seven-bit signals until a release signal is applied to the control input C. As will be clear momentarily, no such release signal is forthcoming in the presence of a sequence of four tones.

The signal appearing on the "3" output of the counter 64 is coupled to the C input of the multivibrator circuit 90 which produces signals on the Q and $\overline{Q}$ outputs only when the C input is high at the same time the B input becomes low. Referring to FIGS. 6B and 6D, it may be seen that, the C input must be high when the B input becomes low in order to produce a signal on the $\overline{Q}$ output. Accordingly, no signal is produced on the $\overline{Q}$ output. Without such signal, the display driver 80 is unable to release the signals present on the inputs thereto.

Since there are no signals generated by the multivibrator circuit 90, none is applied to the multivibrator circuit 100, and, therefore, no signal appears on the $\overline{Q}$ output thereof. However, the counter 64 and the buffer and memory device 46 are reset at time $t_{10}$ by virtue of the predetermined time interval following the end of the fourth tone at $t_7$. The "4" output of the counter 64 becoming high provides a signal to the set input of the latching circuit 120, thereby causing it to light the bulb 122. The possessor of the receiver 20 is therefore apprised that an improper code consisting of too many tones has been received, but not displayed. The Q output of the multivibrator circuit 90 becomes high when the next proper code sequence is received, which high output will reset the latching circuit 120 and extenguish the bulb 122.

While the foregoing example is based on the receipt of four tones, it is to be understood that the same remarks would be applicable to the receipt of five, six, or any number of tones greater than that to which the decoder 40 is designed to respond.

Turning now to FIG. 7, the manner in which the decoder 40 responds to too few tones will be described. In this example, it is assumed that a sequence of two tones is applied to the tone detectors 42, which two tones are detected, converted in the converter 44 to a binary code, and applied to the buffer and memory device 46. The binary code is also applied to the Schmitt trigger 48 which generates a sequence of two pulses depicted in FIG. 7A. At time $t_1$, in response to the commencement of the first pulse, the output of the multivibrator circuit 50 becomes high, as shown in FIG. 7B, and remains high until $t_6$ which is a predetermined time following cessation of the last tone at $t_4$.

Also at time $t_1$, an energizing signal is generated in the manner previously described on the reset inputs of the counter 64 and the buffer and memory device 46. The counter therefore produces pulses sequentially on the "1" and "2" outputs which are used by the buffer and memory device 46 to couple the binary codes on the input 45 to the outputs 46$a$ and 46$b$. No signal appears on the "3" output of the counter 64. The binary signals on the outputs 46$a$ and 46$b$ cannot pass through the display driver 80 until a release signal is applied to the control input thereof. However, because the "3" output of the counter 64 does not go high, no release signal can be produced by the multivibrator circuit 90. Accordingly, if only two tones are received by the decoder 40, no number will appear on the display devices 84$a$–84$c$.

The signal on the "1" output and/or the signal on the "2" output going high causes the OR gate 112 to produce a high output which sets the latching circuit 114, causing the same to latch on. The delay circuit 116 prevents the latching signal from immediately turning on the bulb 118. If the third tone is received, the "3" output of the counter 64 becomes high, which is applied to the reset input of the latching circuit 114, so as to disrupt the latching voltage and prevent operation of the light bulb 118. However, in this example, only two tones were received, so that the "3" output of the counter 64 does not become high and the latching circuit 114 is not reset. Thus, after the short delay furnished by the delay circuit 116, the bulb 118 becomes lit, thereby apprising the operator that less than the proper number of tones has been received by the decoder 40.

If, in a particular instance, it is not important to know whether too few, or too many tones have been received, then a slight modification may be made, so that the same bulb is illuminated, in the event of either occurrence.

Several displays may be provided, each responding to a different release signal. Further, each release signal may result from a different "predetermined" number of tones.

What has been described, therefore, is a decoder 40 which is arranged to respond to a predetermined number of words, the particular decoder described herein being arranged to respond to a sequence of three tones. Moreover, the tones are converted to signals which are stored in the display driver 80 and are released by a release signal only when the proper number of tones has been received. The release signal is not generated when less than that number is received, nor is it generated when more than that number is received. Then, the display device will not display erroneous information as the result of simultaneous or near simultaneous transmissions. In a preferred form, alerting means are provided to inform the operator that a transmission has occurred which has not been displayed, either because there were too few or too many tones received.

It is believed that the invention, its mode of construction and assembly, and many of its advantages should be readily understood from the foregoing without further description, and it should also be manifest that, while a preferred embodiment of the invention has been shown and described for illustrative purposes, the structural details are, nevertheless, capable of wide variation within the purview of the invention as defined by the appended claims.

What is claimed is:

1. A decoder responsive to a code consisting of a predetermined number of words having no start and stop components, each of said words lasting for at least a predetermined duration, said decoder comprising memory means having a signal input coupled to receive the words and being operative to store signals corresponding to the words, counting means for simultaneously counting the number of words, circuit means coupled to said counting means and being responsive to the lack of a word in the predetermined duration immediately following said predetermined number of words to produce a release signal, and utilization means coupled to said memory means and to said circuit means and being operative to provide output information from said memory means corresponding to the code only upon receipt of the release signal, whereby said decoder produces output information only upon receipt of exactly the predetermined number of words.

2. The decoder set forth in claim 1, wherein said circuit means includes a monostable multivibrator responsive to all the words to produce a release signal having a duration determined by the time constant of said multivibrator.

3. The decoder set forth in claim 1, wherein said utilization means includes storage means to cause the information to be provided indefinitely after completion of the code until a subsequent release signal is produced as the result of the receipt of a subsequent code.

4. The decoder set forth in claim 1, wherein said utilization means includes display means for displaying a number corresponding to the code.

5. The decoder set forth in claim 1, wherein said utilization means includes display means for displaying a number corresponding to the code, and driver means for supplying to the display means signals representative of the code.

6. The decoder set forth in claim 5, wherein said driver means is operative to continue to supply signals to said display means as the result of a previous code until the release signal for the next code is generated.

7. The decoder set forth in claim 1, and further comprising alerting means coupled to said counting means and being responsive to a code including more or less than the predetermined number of words to become operative to produce an alerting signal.

* * * * *